(12) United States Patent
Mizushima et al.

(10) Patent No.: US 10,379,289 B2
(45) Date of Patent: *Aug. 13, 2019

(54) OPTICAL ZOOMING SYSTEM FOR FUSION SPLICERS

(71) Applicant: AFL Telecommunications LLC, Duncan, SC (US)

(72) Inventors: Toshirou Mizushima, Greer, SC (US); Hiroshi Sugawara, Greenville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,779

(22) Filed: Feb. 15, 2018

(65) Prior Publication Data

US 2018/0172912 A1  Jun. 21, 2018

Related U.S. Application Data (63) Continuation of application No. 14/429,397, filed as application No. PCT/US2014/014652 on Feb. 4, 2014, now Pat. No. 9,939,583.

(60) Provisional application No. 61/760,336, filed on Feb. 4, 2013.

(51) Int. Cl.
*G02B 6/42* (2006.01)
*G02B 7/09* (2006.01)
*G02B 6/255* (2006.01)

(52) U.S. Cl.
CPC ......... *G02B 6/2555* (2013.01); *G02B 6/2551* (2013.01); *G02B 6/4221* (2013.01); *G02B 7/09* (2013.01)

(58) Field of Classification Search
None
See application file for complete search history.

(56) References Cited

U.S. PATENT DOCUMENTS

| | | | |
|---|---|---|---|
| 2003/0231834 A1 | 12/2003 | Massey et al. | |
| 2004/0114257 A1* | 6/2004 | Tanaka | G02B 7/021 359/819 |
| 2004/0223213 A1 | 11/2004 | Fukuyama et al. | |
| 2004/0228601 A1 | 11/2004 | Porter et al. | |
| 2005/0047725 A1 | 3/2005 | Ahrens | |
| 2005/0052533 A1* | 3/2005 | Ito | G01S 3/7865 348/169 |
| 2009/0214166 A1* | 8/2009 | Huang | G02B 6/2551 385/96 |

OTHER PUBLICATIONS

AFL Telecommunications LLC; International Patent Application No. PCT/US2014/014652; International Search Report; dated May 23, 2014; (1 page).

(Continued)

*Primary Examiner* — Xiaolan Xu
(74) *Attorney, Agent, or Firm* — Dority & Manning, P.A.

(57) ABSTRACT

The invention relates to an optical zooming system for use on fusion splicers. The system may include a lens, camera, and a zooming mechanism, which allows the camera and the lens to move relative to each other. The zooming mechanism may be set to a "zoom out" configuration for aligning the cores of fibers. The zooming mechanism may also be set to a "zoom in" configuration for adjusting fibers with a large diameter.

15 Claims, 9 Drawing Sheets

(56) References Cited

OTHER PUBLICATIONS

QIOPTIQ Imaging Solutions; Optem Zoom 70XL 7:1 Optical System; Qiuptig Imaging Solutions; Copyright 2008; [Retrieved on: Feb. 14, 2018 ]; Retrieved from internet:URL: http://www.zast.net/product/cat/Optem/Zoom70XL.pdf; (8 pages).

* cited by examiner

OPTICAL ZOOMING SYSTEM FOR FUSION SPLICERS

CROSS-REFERENCE TO RELATED APPLICATIONS

This application is a continuation of U.S. application Ser. No. 14/429,397 filed on Mar. 19, 2015, which is a National Stage Application of PCT/US2014/014652, filed on Feb. 4, 2014, which claims the benefit of priority to U.S. Provisional Application No. 61/760,336, filed on Feb. 4, 2013, the disclosures of all of which are incorporated by reference herein in their entireties.

BACKGROUND

1. Field

The invention relates to an optical zooming system for use on fusion splicers.

2. Related Art

The background information provided herein is for the purpose of generally presenting the context of the disclosure. Work of the presently named inventor, to the extent it is described in this background section, as well as aspects of the description that may not otherwise quality as prior art at the time of filing, are neither expressly nor impliedly admitted as prior art against the present disclosure.

Due to the development of optical fiber industries, fusion splicers need to handle a much larger range of fiber diameter (for example, 30 µm to 3 mm). The camera system needs to have a very large field of view (for example, 3 mm) to see the entire large fiber; a very high resolution (for example, 0.1 µm) to align fiber cores; and moderate cost for industrial applications. Camera chips with a 3 mm FOV and 0.1 µm resolution (900 M pixel) are not available in the market. Therefore, there is a need to develop an optical zooming system for advanced fusion splicers.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

An embodiment of the invention is an optical zooming system for splicing fibers together which has a lens to view an image of the fibers, a camera which captures an image of the fibers for aligning cores of the fibers, and a zooming mechanism which facilitates movement of the lens and the camera during a transition between a zoom in configuration and a zoom out configuration.

Other features of the embodiment may include a flex cable attached to the camera which sends data from the camera to a computer, a rotation device which switches the optical zooming apparatus between the zoom in configuration and the zoom out configuration, a lens holder attached to the lens and slidably attached to the zooming mechanism, a camera holder attached to the camera and slidably attached to the zooming mechanism, and a base which supports the zooming mechanism.

Other features of the embodiment can include the rotation device having a link mechanism which switches the optical zooming apparatus between the zoom in configuration and the zoom out configuration when the link mechanism is rotated, a first attachment bar which attaches the lens holder to the link mechanism, and a second attachment bar which attaches the camera holder to the link mechanism. Other features of the embodiment may include the rotation device also having a motor attached to the link mechanism which automates the switching of the optical zooming apparatus between the zoom in configuration and the zoom out configuration.

Other features of the embodiment may include a configuration base attached to the base, a guide rail attached to the configuration base, a focus bracket base attached to the configuration base, an intermediate base attached to the focus bracket base, and stoppers attached to the intermediate base which adjusts the movement of the lens holder and the camera holder. Other features of the embodiment may include the zooming mechanism having a fine adjust motor attached to the intermediate base, wherein the fine adjust motor adjusts the position of the intermediate base, which uses the stopper to adjust the position of the lens holder and the camera holder, along the focus bracket base to adjust the focus of the image produced in the lens.

Other features of the embodiment may include a second camera positioned at 90 degrees relative to the camera which provides a second image of the plurality of optical fibers to further align the cores of the fibers.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive.

Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1A:
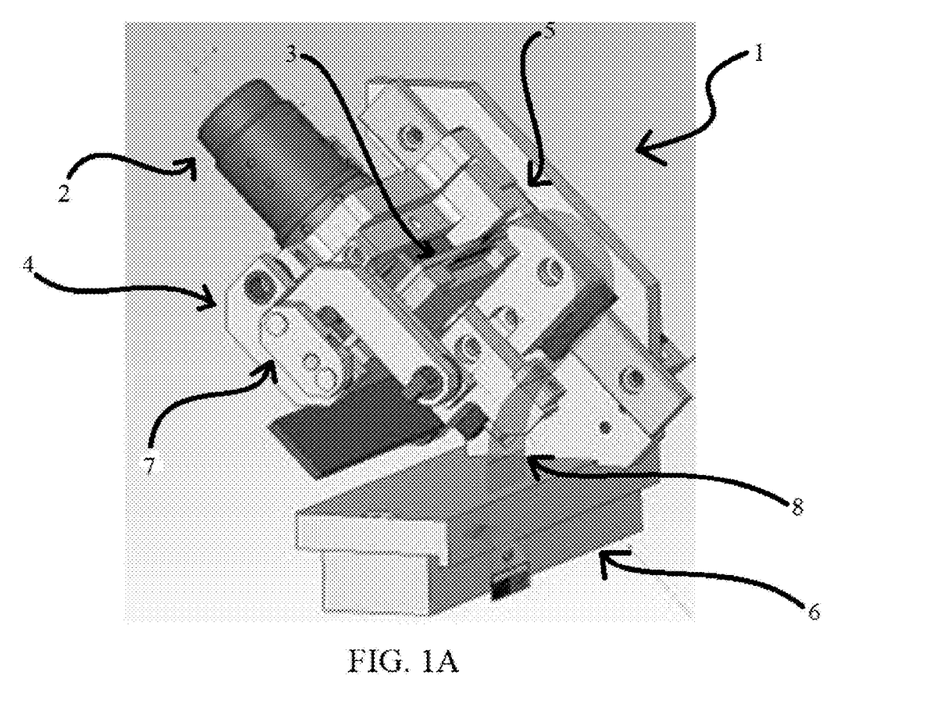
FIG. 1a is an exemplary embodiment of an optical zooming device 1 in a "zoom out" configuration.

Referring to the drawings, FIG. 1a is an exemplary embodiment of an optical zooming device 1 in a "zoom out" configuration. In an exemplary embodiment, the "zoom out" configuration is used for adjusting large diameter fibers. The optical zooming device 1 comprises a lens 2, a camera 3, a rotation device 4 having a rotation bar 7, a zooming mechanism 5, and a base 6. In an exemplary embodiment, the lens 2 allows a user to view the optical fibers. In an exemplary embodiment, the camera 3 acts as an imaging device for taking a picture of the optical fibers being viewed. In an exemplary embodiment, a second camera (not shown) is positioned at a 90 degree angle relative to the position of the camera 3 in order to provide a second image of the fibers to further align the cores in the fibers.

In an exemplary embodiment, each of the fibers are held by v-recessed blocks, which is number 52 in a conventional fiber splicer as in FIG. 1 of U.S. Pat. No. 6,799,903, which is herein incorporated by reference. In an exemplary embodiment, the rotation device 4 allows a user to change the optimal zooming device 1 from a "zoom in" configuration to a "zoom out" configuration. In an exemplary embodiment, if the link mechanism 7 is rotated by 180° in a clockwise direction along its length relative to its current display in FIG. 1a, then the optical zooming device 1 will convert to a "zoom in" configuration. In an exemplary embodiment, the zooming mechanism 5 stabilizes and is attached to the lens 2, camera 3, and the rotation device 4. In an exemplary embodiment, both the camera 3 and the rotation device 4 are slideably attached to the zooming mechanism. In an exemplary embodiment, the zooming mechanism 5 allows for changing the "zoom" configuration when the rotation device 4 is operated. In an exemplary embodiment, the base 6 is attached to the zooming mechanism 5. In an exemplary embodiment, the base 6 or a computer processes data generated by the camera 3 through a flex cable 8. In an exemplary embodiment, the flex cable provides power to the camera 3. In an exemplary embodiment, two fiber optic cables are spliced by attaching each of the two fiber optic cables to v-recessed blocks at opposite ends of the camera 3, adjusting the optical zooming device 1 from a "zoom in" configuration to a "zoom out" configuration, using the image produced by the lens 2 to align the cores of the two fiber optic cables, and splicing the two fibers by using a splicer.

Figure 1B:
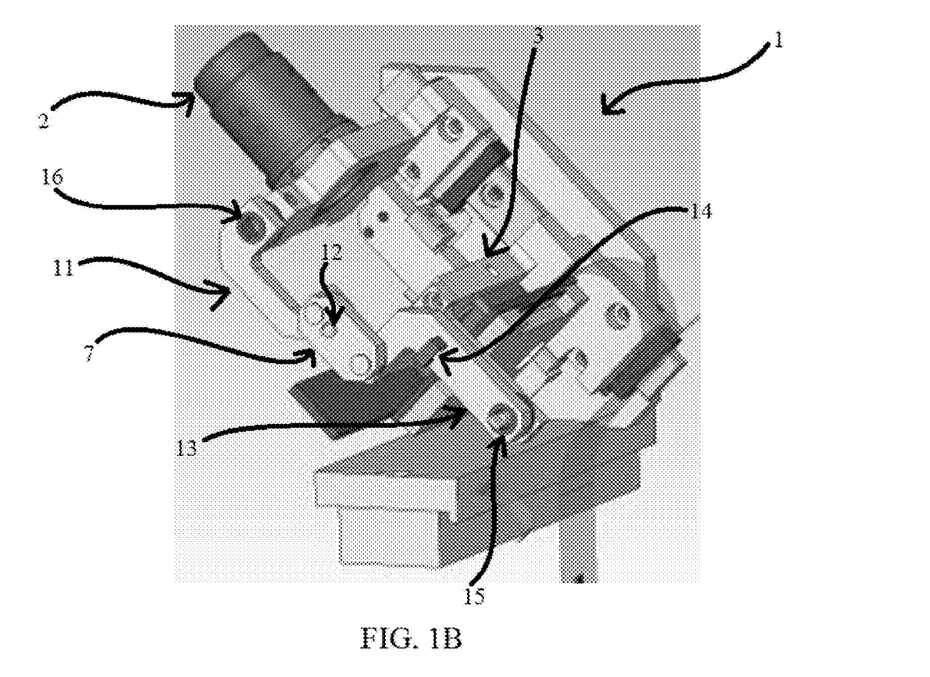
FIG. 1b is an exemplary embodiment of an optical zooming device 1 in a "zoom in" configuration.

FIG. 1b is an exemplary embodiment of an optical zooming device 1 in a "zoom in" configuration. In an exemplary embodiment, the "zoom in" configuration is used for core alignment for two fibers being spliced. In an exemplary embodiment, the link mechanism 7 is attached to a first attachment bar 11 and a second attachment bar 13. In an exemplary embodiment, when the link mechanism 7 is rotated from a "zoom out" configuration, as shown in FIG. 1a, to a "zoom in" configuration, as shown in FIG. 1b, the second attachment bar 13 moves away from the lens 2 in conjunction with the camera 3, and the first attachment bar 11 moves away from the camera 3 in conjunction with the lens 2. In an exemplary embodiment, a sensor 14 and a sensor shaft 15 are unengaged. In an exemplary embodiment, the sensor 14 and the sensor shaft 15 magnetically engage with each other in the "zoom out" configuration, as shown but not labeled in FIG. 1a. In an exemplary embodiment, the sensor shaft 15 and the shaft 16 allow for the link mechanism 7 to maintain its shape. Thus, In an exemplary embodiment, the link mechanism 7 resists bending when in operation. In an exemplary embodiment, a motor shaft 12 is provided as an attachment for a motor (not shown). In an exemplary embodiment, the motor (not shown) allows for mechanical switching between a "zoom out" configuration and a "zoom in" configuration.

Figure 1C:
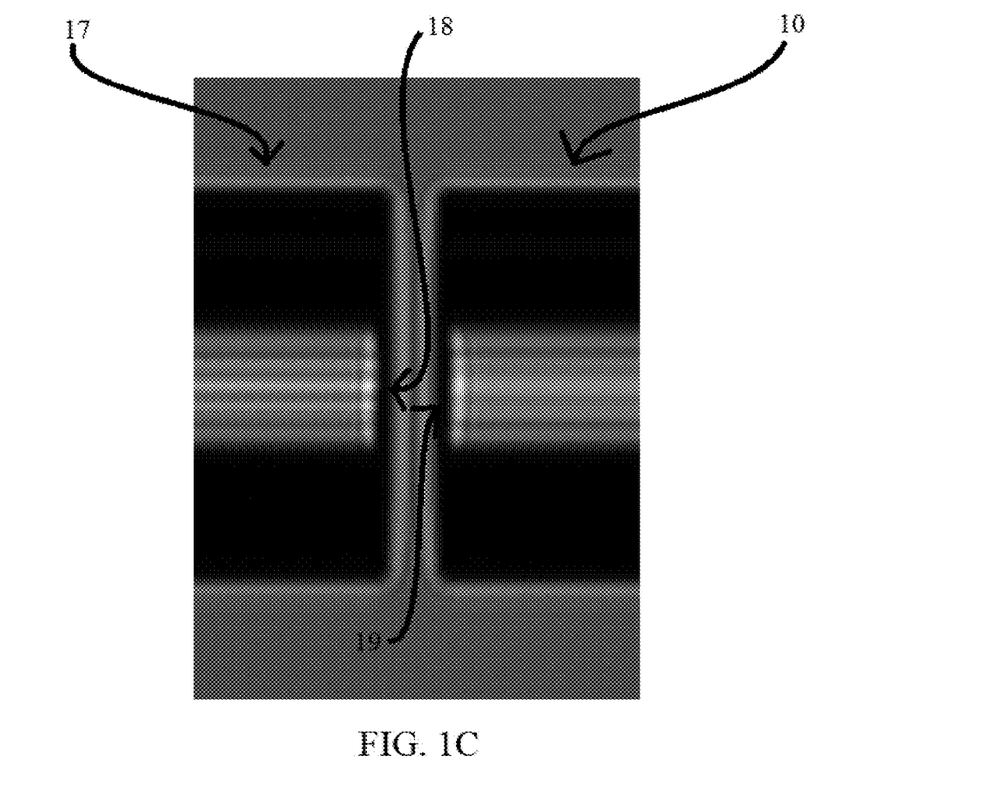
FIG. 1c is an exemplary embodiment of an image taken of an optical fiber 10 and an optical fiber 17 when the optical zooming device 1 is in a "zoom out" configuration.

FIG. 1c is an exemplary embodiment of an image taken of an optical fiber 10 and an optical fiber 1 when the optical rooming device 1 is in a "zoom out" configuration. In an exemplary embodiment, the "zoom out" configuration allows for a user to readily identify an alignment of core 18 and core 19 of the optical fiber 17 and the optical fiber 10 respectively. In an exemplary embodiment, the optical fiber 17 and the optical fiber 10 are transparent. In an exemplary embodiment, a light (see FIG. 1 of U.S. Pat. No. 6,799,903) illuminates the transparent optical fiber 17 and the transparent optical fiber 10. In an exemplary embodiment, illuminating the optical fiber 17 and the optical fiber 10 shows an image of the core 18 and the core 19.

Figure 1D:
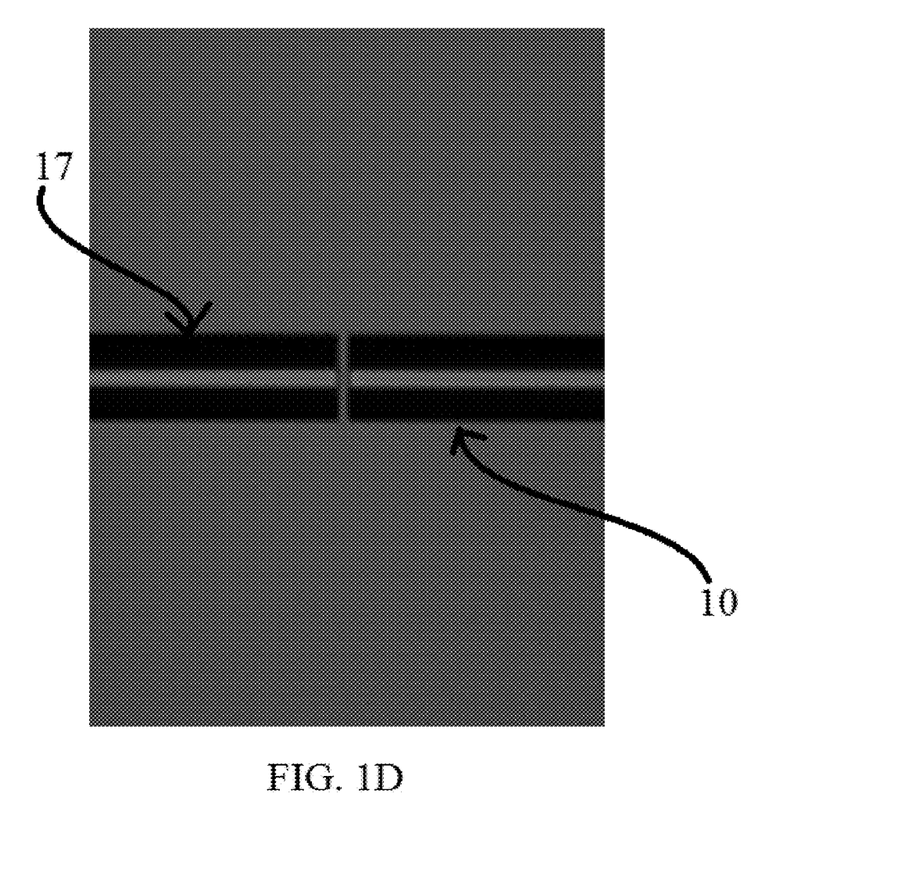
FIG. 1d is an exemplary embodiment of an image taken of an optical fiber 10 and an optical fiber 17 when the optical zooming device 1 is in a "zoom in" configuration.

FIG. 1d is an exemplary embodiment of an image taken of an optical fiber 10 and an optical fiber 17 when the optical zooming device 1 is in a "zoom in" configuration. In an exemplary embodiment, the area covered allows for fibers with comparatively large diameters in relation to the fiber 10 and fiber 17 to be aligned. In an exemplary embodiment, the diameter of fiber 10 and fiber 17 is 125 µm.

Figure 2A:
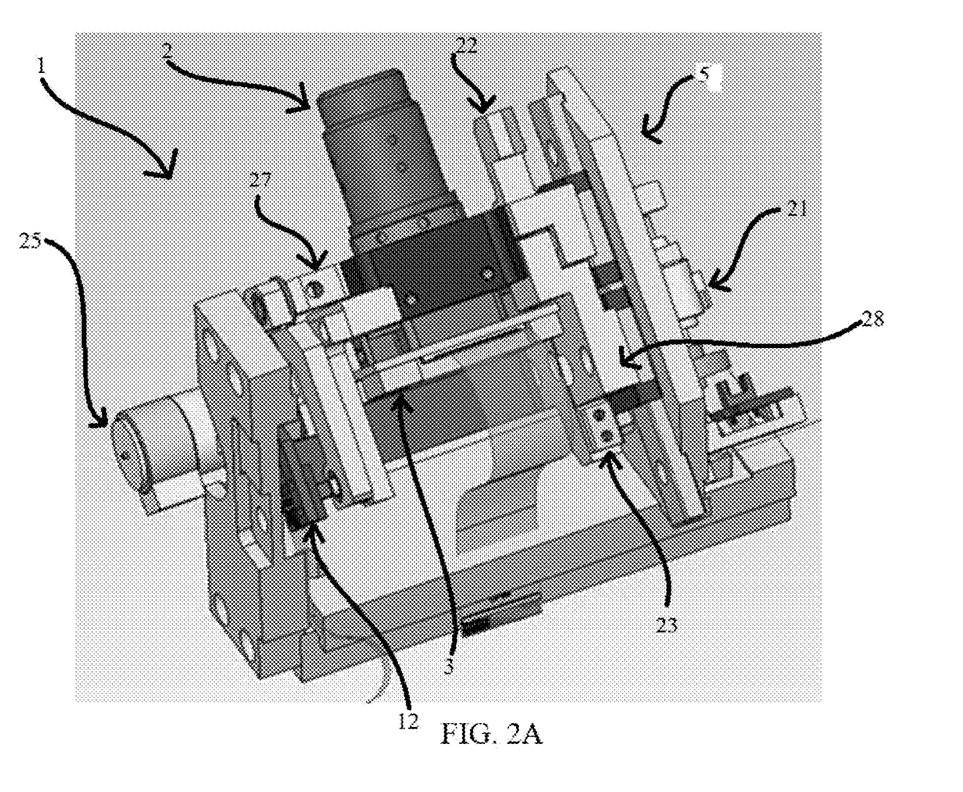
FIG. 2a is an exemplary embodiment of a rotated view of an optical zooming device 1 in a "zoom out" configuration.

FIG. 2a is an exemplary embodiment of a rotated view of an optical zooming device 1 in a "zoom out" configuration. In an exemplary embodiment, the zooming mechanism 5 includes a fine adjust motor 21 that mechanically adjusting the focus of an image produced in the lens 2. In an exemplary embodiment, the zooming mechanism 5 also comprises a stopper 22 and a stopper 23 that engage with a lens holder 27 and a camera holder 28 respectively when the optical zooming device 1 is in a "zoom in" configuration. In an exemplary embodiment, a motor 25 is connected to the motor shaft 12 and mechanically controls the rotation device (not shown) to put the optical zooming device 1 in a "zoom in" configuration or a "zoom out" configuration.

Figure 2B:
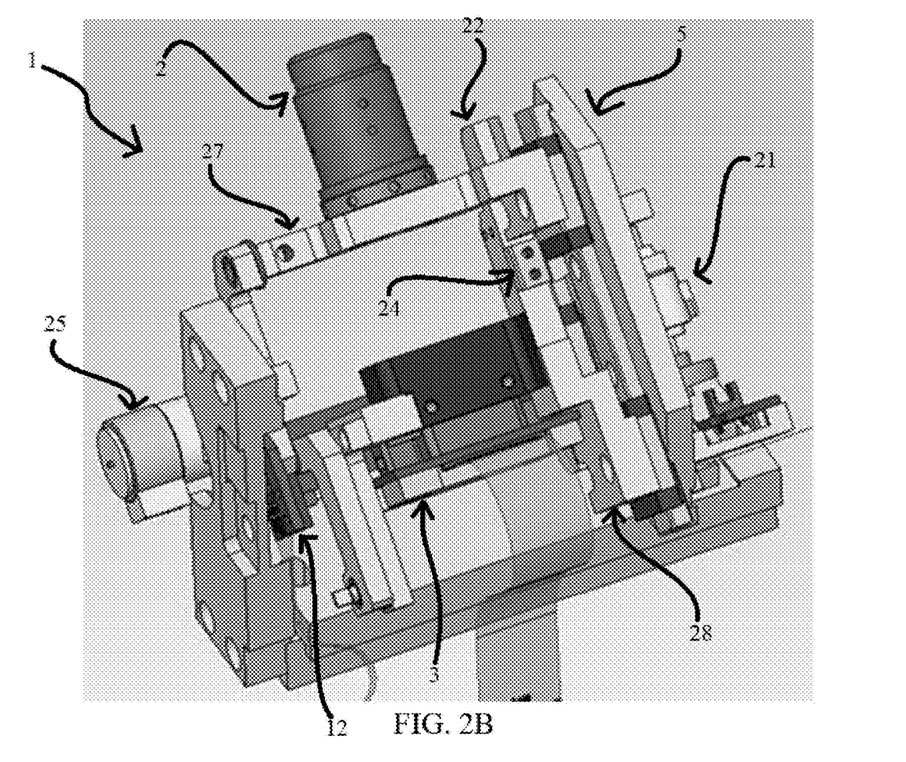
FIG. 2b is an exemplary embodiment of a rotated view of an optical zooming device 1 in a "zoom in" configuration.

FIG. 2b is an exemplary embodiment of a rotated view of an optical zooming device 1 in a "zoom in" configuration. In an exemplary embodiment, the stopper 22 engages with the lens holder 27 and the stopper 23 (not shown) engages with the camera holder 28 to prevent unwanted movement. In an exemplary embodiment, the stopper 24 engages with the lens holder 27 and the camera holder 28 when the optical zooming device is in a "zoom out" configuration so that the lens holder 27 and the camera holder 28 to not contact each other.

Figure 3:
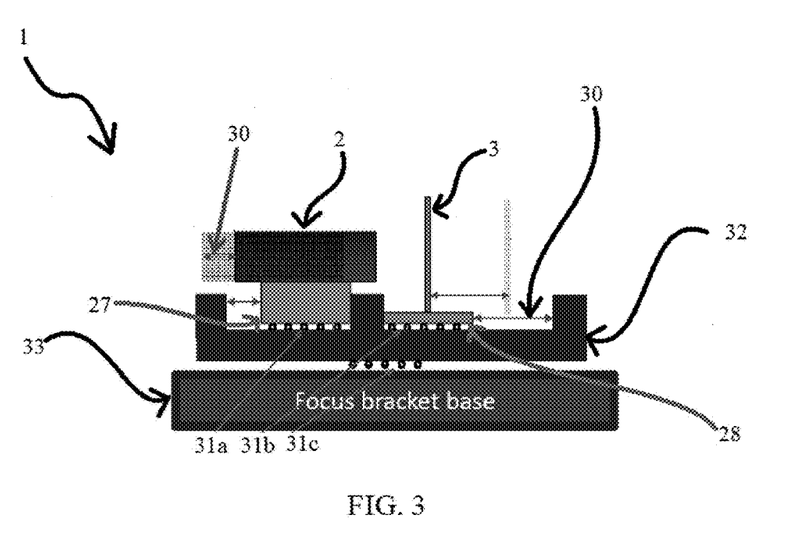
FIG. 3 is an exemplary embodiment of a diagram of the optical zooming device 1 in a "zoom out" configuration.

FIG. 3 is an exemplary embodiment of a diagram of the optical zooming device 1 in a "zoom out" configuration. In an exemplary embodiment, the direction arrows 30 show the distances that the lens 2, the camera 3, the lens holder 27, and the camera holder 28 are designed to travel along the top of the intermediate base 32. In an exemplary embodiment, lens bearings 31a and camera bearings 31b allow for the lens 2 and the camera 3 respectively to move across the top of the intermediate base 32. In an exemplary embodiment, the line adjust bearings 31c allow for the intermediate base 32 to move relative to the focus bracket base 33 in order to adjust the focus of an image created in the lens 2. In an exemplary embodiment, the fine adjust motor shown in FIG. 2a uses the fine adjust bearings 31c and the intermediate base 32 to adjust the focus of an image created in the lens 2.

Figure 4A:
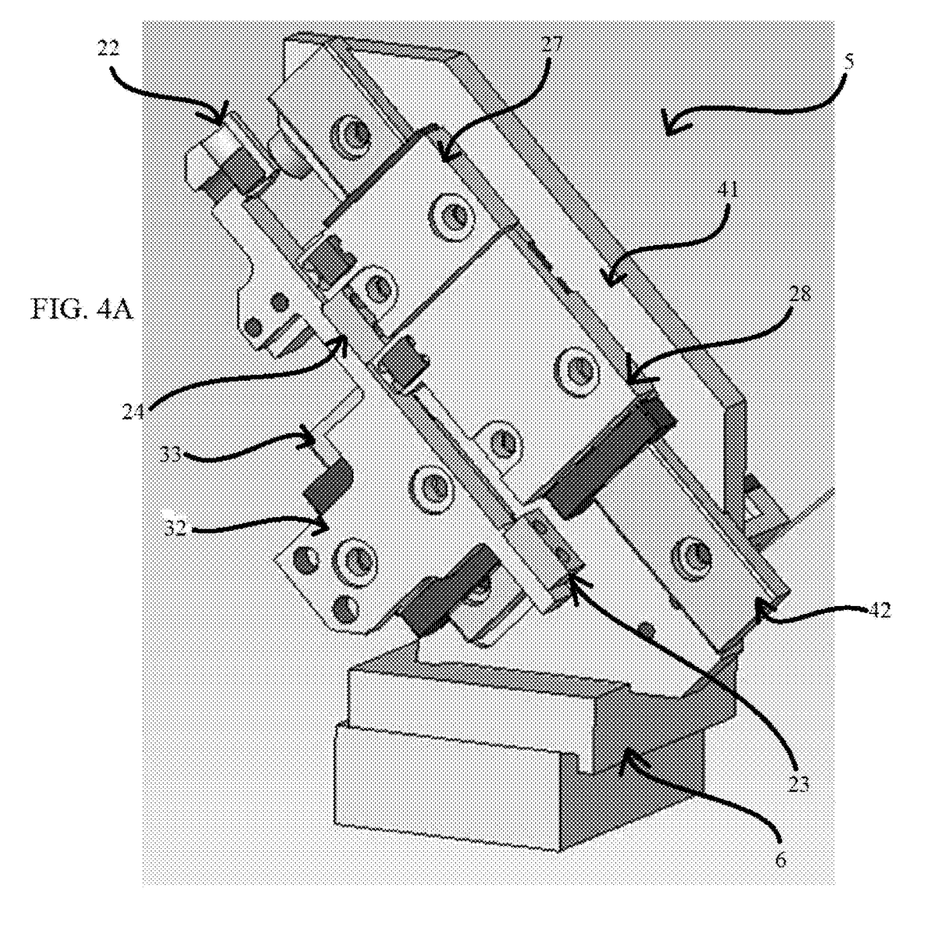
FIG. 4a is an exemplary embodiment of a zooming mechanism 5 in an optical zooming device 1, which is in a "zoom out" configuration.

FIG. 4a is an exemplary embodiment of a zooming mechanism 5 in an optical zooming device 1, which is in a "zoom out" configuration. In an exemplary embodiment, the zooming mechanism 5 includes a configuration base 41, a configuration rail 42, an intermediate base 32, and a focus bracket base 33. In an exemplary embodiment, the configuration base 41 is attached to the base 6. In an exemplary embodiment, the guide rail 42 is attached to the configuration base 41. In an exemplary embodiment, the lens holder 21 and the camera holder 28 are slidably attached to the guide base. In an exemplary embodiment, the lens holder 27 and the camera holder 28 slide along the intermediate base 32 using lens bearings (not shown) and camera bearings (not shown) when the optical zooming device 1 is switched between a "zoom out" configuration and a "zoom in" configuration. In an exemplary embodiment, the focus bracket base 33 is attached to the configuration base 41. In an exemplary embodiment, the intermediate base 32 is slidably attached to the focus bracket base 33. In an exemplary embodiment, stopper 22, stopper 23, and stopper 24 are attached to the intermediate base 32. In an exemplary embodiment, a fine adjust motor (not shown) adjusts the position of the intermediate base 32, which uses the stopper 24 to adjust the position of the lens holder 27 and the camera holder 28, which adjusts the focus of the image produced in the lens 2.

Figure 4B:
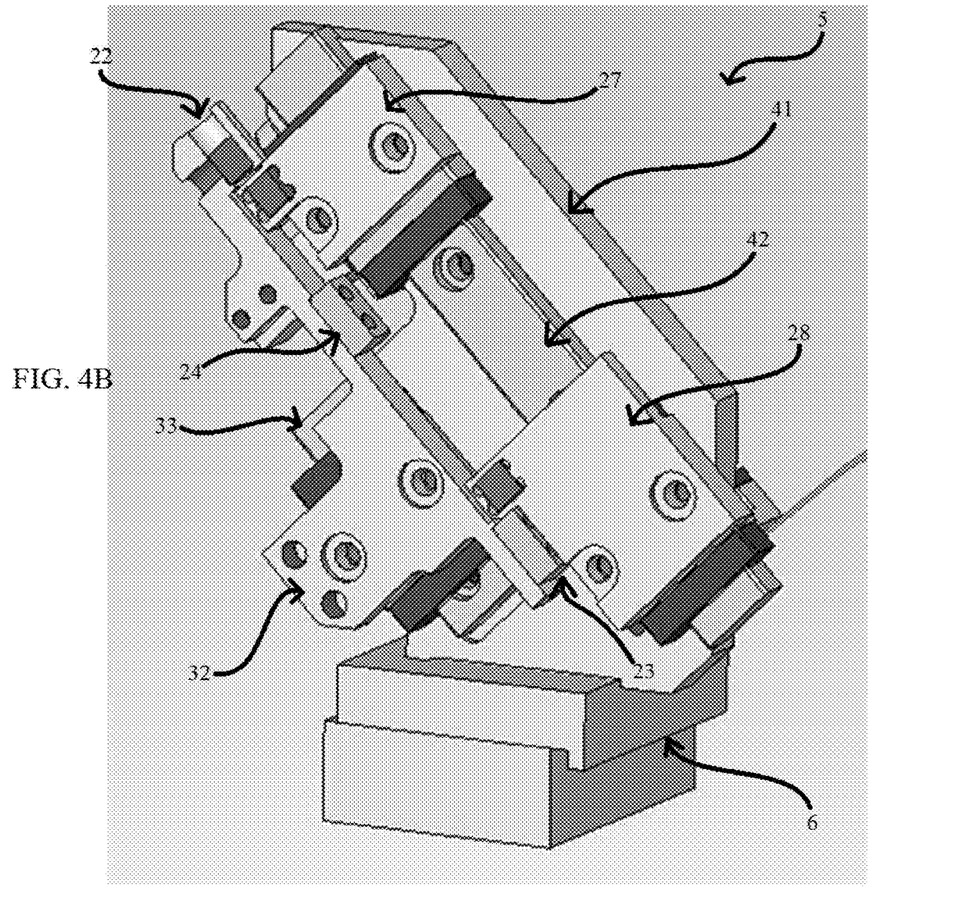
FIG. 4b is an exemplary embodiment of a zooming mechanism 5 in an optical zooming device 1, which is in a "zoom in" configuration.

FIG. 4b is an exemplary embodiment of a zooming mechanism 5 in an optical zooming device 1, which is in a "zoom in" configuration. In an exemplary embodiment, a fine adjust motor (not shown) adjusts the position of the intermediate base 32, which uses the stopper 22 and the stopper 23 to adjust the position of the lens holder 27 and the camera holder 28, which adjusts the focus of the image produced in the lens 2.

The invention claimed is:

1. An optical zooming system, the system comprising:
a lens holder;
a camera holder; and
a zooming mechanism, wherein the lens holder and camera holder are slidably attached to the zooming mechanism, the zooming mechanism comprising:
a configuration base;
a guide rail attached to the configuration base;
a focus bracket base attached to the configuration base;
an intermediate base attached to the focus bracket base; and
stoppers attached to the intermediate base, each stopper engaged with one of the lens holder or camera holder.

2. The system of claim 1, wherein the zooming mechanism further comprises a fine adjust motor attached to the intermediate base, wherein the fine adjust motor adjusts the position of the intermediate base along the focus bracket base.

3. The system of claim 1, further comprising a first camera attached to the camera holder.

4. The system of claim 1, further comprising a second camera, the second camera positioned at 90 degrees relative to the first camera.

5. The system of claim 1, further comprising a lens attached to the lens holder.

6. The system of claim 1, further comprising a rotation device.

7. The system of claim 6, wherein the rotation device comprises a link mechanism, a first attachment bar attaching the lens holder to the link mechanism, and a second attachment bar attaching the camera holder to the link mechanism.

8. The system of claim 7, wherein the rotation device further comprises a motor attached to the link mechanism.

9. An optical zooming system, the system comprising:
a lens holder;
a camera holder;
a zooming mechanism, wherein the lens holder and camera holder are slidably attached to the zooming mechanism; and
a rotation device, wherein the rotation device comprises a link mechanism, a first attachment bar attaching the lens holder to the link mechanism, and a second attachment bar attaching the camera holder to the link mechanism.

10. The system of claim 9, wherein the rotation device further comprises a motor attached to the link mechanism.

11. The system of claim 9, wherein the zooming mechanism comprises:
a configuration base;
a guide rail attached to the configuration base;
a focus bracket base attached to the configuration base;
an intermediate base attached to the focus bracket base; and
stoppers attached to the intermediate base, each stopper engaged with one of the lens holder or camera holder.

12. The system of claim 11, wherein the zooming mechanism further comprises a fine adjust motor attached to the intermediate base, wherein the fine adjust motor adjusts the position of the intermediate base along the focus bracket base.

13. The system of claim 9, further comprising a first camera attached to the camera holder.

14. The system of claim 9, further comprising a second camera, the second camera positioned at 90 degrees relative to the first camera.

15. The system of claim 9, further comprising a lens attached to the lens holder.

* * * * *